US011822995B2

United States Patent
Lewis et al.

(10) Patent No.: US 11,822,995 B2
(45) Date of Patent: Nov. 21, 2023

(54) RESONATOR-BASED OBJECT POSE DETERMINATION

(71) Applicant: Hewlett-Packard Development Company, L.P., Spring, TX (US)

(72) Inventors: M. Anthony Lewis, Palo Alto, CA (US); William J. Allen, Corvallis, OR (US); Douglas Pederson, Corvallis, OR (US); Jarrid Wittkopf, Palo Alto, CA (US); Kristopher J. Erickson, Palo Alto, CA (US); Robert Ionescu, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 191 days.

(21) Appl. No.: 17/414,789

(22) PCT Filed: Apr. 12, 2019

(86) PCT No.: PCT/US2019/027290
§ 371 (c)(1),
(2) Date: Jun. 16, 2021

(87) PCT Pub. No.: WO2020/209871
PCT Pub. Date: Oct. 15, 2020

(65) Prior Publication Data
US 2022/0083748 A1    Mar. 17, 2022

(51) Int. Cl.
*G06K 7/10*        (2006.01)
*G06K 19/067*    (2006.01)

(52) U.S. Cl.
CPC ..... *G06K 7/10009* (2013.01); *G06K 19/0672* (2013.01)

(58) Field of Classification Search
None
See application file for complete search history.

(56) References Cited

U.S. PATENT DOCUMENTS

| | | | |
|---|---|---|---|
| 3,212,091 A | 10/1965 | Bissett et al. | |
| 5,581,257 A | 12/1996 | Greene et al. | |
| 7,274,285 B2 * | 9/2007 | Chaloner | G01S 13/753 340/505 |
| 2007/0299623 A1 * | 12/2007 | Gandelsman | G01D 5/22 703/2 |
| 2015/0170013 A1 | 6/2015 | Wilson et al. | |
| 2017/0326791 A1 | 11/2017 | Abbott | |
| 2017/0355147 A1 | 12/2017 | Buller et al. | |
| 2018/0095450 A1 | 4/2018 | Lappas et al. | |

(Continued)

FOREIGN PATENT DOCUMENTS

| | | |
|---|---|---|
| WO | WO-2018048898 | 3/2018 |
| WO | WO-2019066783 | 4/2019 |

*Primary Examiner* — John F Mortell
(74) *Attorney, Agent, or Firm* — SHOOK, HARDY AND BACON L.L.P.

(57) ABSTRACT

In one example in accordance with the present disclosure, a system is described. The system includes at least one directional antenna to 1) emit energy waves towards a mass in which an object is disposed and 2) receive reflected signals from a resonator disposed on the object as the mass is moved relative to the directional antenna. The system also includes a controller to, based on received reflected signals, determine a pose of the object within the mass.

15 Claims, 8 Drawing Sheets

(56) References Cited

U.S. PATENT DOCUMENTS

2018/0154484 A1     6/2018  Hall
2018/0201021 A1     7/2018  Beaver et al.
2018/0240005 A1*    8/2018  Klemm ............ G06K 19/07767
2019/0353633 A1*   11/2019  Karimi ............... G01N 33/2823

* cited by examiner

RESONATOR-BASED OBJECT POSE DETERMINATION

BACKGROUND

Additive manufacturing devices produce three-dimensional (3D) objects by building up layers of material. Some additive manufacturing devices are referred to as "3D printing devices" because they use inkjet or other printing technology to apply some of the manufacturing materials. 3D printing devices and other additive manufacturing devices make it possible to convert a computer-aided design (CAD) model or other digital representation of an object directly into the physical object.

BRIEF DESCRIPTION OF THE DRAWINGS

The accompanying drawings illustrate various examples of the principles described herein and are part of the specification. The illustrated examples are given merely for illustration, and do not limit the scope of the claims.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Additive manufacturing systems make a three-dimensional (3D) object through the solidification of layers of a build material on a bed within the system. Additive manufacturing systems make objects based on data in a 3D model of the object generated, for example, with a computer-aided drafting (CAD) computer program product. The model data is processed into slices, each slice defining portions of a layer of build material that is to be solidified.

In one example, to form the 3D object, a build material, which may be powder, is deposited on a bed in a layer-wise fashion. A fusing agent is then dispensed onto portions of the layer of build material that are to be fused to form a layer of the 3D object. The system that carries out this type of additive manufacturing may be referred to as a powder and fusing agent-based system. The fusing agent disposed in the desired pattern increases the energy absorption of the topmost layer of build material on which the agent is disposed. The build material is then exposed to energy such as electromagnetic radiation. The electromagnetic radiation may include infrared light, laser light, or other forms of suitable electromagnetic radiation. Due to the increased energy absorption properties imparted by the fusing agent, those portions of the build material that have the fusing agent disposed thereon heat to a temperature greater than the fusing temperature for the build material.

Accordingly, as energy is applied to a surface of the build material, the build material that has received the fusing agent, and therefore has enhanced energy absorption characteristics, fuses while that portion of the build material that has not received the fusing agent remains in powder form. Those portions of the build material that receive the agent and thus have increased energy absorption properties may be referred to as fused portions. By comparison, the applied energy is not so great so as to increase the energy absorption properties of the portions of the build material that are free of the fusing agent. Those portions of the build material that do not receive the agent and thus do not have increased energy absorption properties may be referred to as unfused portions.

Accordingly, a predetermined amount of energy is applied to an entire bed of build material, the portions of the build material that receive the fusing agent, due to the increased energy absorption properties imparted by the fusing agent, fuse and form the object while the unfused portions of the build material are unaffected, i.e., not fused, in the presence of such application of energy. This process is repeated in a layer-wise fashion to generate a 3D object. That is, additional layers may be formed and the operations described above may be performed for each layer to thereby generate a three-dimensional object. Sequentially layering and fusing portions of layers of build material on top of previous layers may facilitate generation of the three-dimensional object. The layer-by-layer formation of a three-dimensional object may be referred to as a layer-wise additive manufacturing process.

The unfused portions of material can then be separated from the fused portions, and the unfused portions may be recycled for subsequent 3D printing operations. While specific reference is made to one type of additive manufacturing process, the principles described herein may apply to other types of manufacturing processes.

In some examples, these types of manufacturing processes, or others, justify a cleaning operation before the part is ready to use. For example, as a result of the additive manufacturing process, powder from the bed may be caked onto the fused part. For example, even though the amount of energy applied to the powder bed material does not completely fuse unfused portions, the unfused portions may clump together, or "cake."

Such caking may result for any number of reasons. As a specific example, heat from energy absorbed by fused portions of the build material, may transfer by conduction to immediately adjacent unfused portions of the build material. This is sometimes referred to as thermal bleed and can increase the cost and difficulty in manufacturing 3D printed objects.

For example, after a 3D printed object is formed, unused build material is removed from around the object. Due to the thermal bleed described above, immediately adjacent unfused build material may become temporarily, or semi-permanently, affixed to the object. The objects therefore are to be cleaned of this unfused caked material before they can be used. Removal of this material can be difficult, time-consuming, and in some cases may even damage the 3D printed object.

Such caking increases the overall cost of additive manufacturing as well. For example, during formation, unfused build material can be recycled and re-used in later 3D printing operations. However, when the unfused build material cakes, it is no longer recyclable. Accordingly, it may be desirable to enable automated systems, such as robotic systems to grasp, manipulate, and clean parts hidden in a mass, or "potato" of caked powdered build material.

However, before such 3D printed objects can be grasped and manipulated by these automated systems, the location and orientation of the object within the mass should be determined so that the automated systems can delicately grasp the object without excessive force so as to not damage the part and such that precise cleaning or other post-processing operations can be performed.

Present methods for determining the pose of parts within a mass of build material are clumsy and ineffective. As used in the present specification and in the appended claims, the term "pose" refers to an identification of various positional characteristics of the object. For example, a pose may include a position along three axes (x, y, and z) of a reference frame as well as rotation about those axes (pitch, yaw, and roll).

For example, while the dimensions of all parts in a build area may be known, a specific part may not be able to be identified relative to the potato that encloses it. Identifying a part within a mass of material may include looking up the intended dimension of the part in the data previously sent to the system and hypothesizing about the hidden part based on the dimensions of the mass. In another example, a mechanical probe may be inserted into the mass to aid in part identification. However, in some cases the parts may be delicate and the probe may cause damage to the part. This may also not be able to detect certain distinguishing characteristics of certain printed objects.

In yet another example, a cage may be added around a 3D printed object. Such cages may carry identification information and orientation fiducials. However, this method reduces overall printer build yield, as precious build volume is allocated away from parts and allocated to the cages. Moreover, there is wasted volume between the cages and the parts. As yet another complication with such a method, the cage itself may also be hidden inside the potato, making the position and orientation of the cage, and the part it encompasses, unknown.

Accordingly, the present specification describes a system and method that has the ability to identify a part inside of an enclosing mass and also to identify a pose of the object inside. Specifically, the present systems and methods add features inside, on the surface of, or nearby to 3D printed objects. The features allow the parts to be identified and localized by probing them with externally supplied electromagnetic energy. Such identification and localization is enabled even when parts are surrounded by optically opaque material, so long as the externally supplied energy can penetrate that material. While specific reference may be made in the present specification to particular types of additive manufacturing processes, the methods and systems described herein may be implemented in accordance with any number of additive manufacturing operations.

According to the present specification, resonators are placed at predetermined poses relative to a part of interest. Following fabrication, by stimulating these resonators with energy and measuring the characteristics of the reflected energy, such as the intensity, direction, and polarization of the reflected signals, a system may determine the identities and poses of the resonators relative to the external energy source. The pose of the external energy source being known allows the poses of the resonators, and hence the poses of the object of interest, to be determined relative to that source. Once the 3D printed object pose within the mass is determined, automated cleaning, or other post-printing operations, are better enabled.

Specifically, the present specification describes a system for determining a pose of an object within a mass. The system includes at least one directional antenna to 1) emit energy waves towards the mass in which the object is disposed and 2) receive reflected signals from a resonator disposed on the object as the mass is moved relative to the directional antenna. The system also includes a controller to, based on received reflected signals determine a pose of the object within the mass.

The present specification also describes a method. According to the method, waves of energy are emitted from a directional antenna towards a mass of powdered build material wherein a three-dimensional (3D) printed object is concealed. Reflected signals are received from at least one resonator disposed within the mass of powdered build material as the mass is moved relative to the directional antenna. Based on received reflected signals an identifier of the 3D printed object is determined as is a pose of the 3D printed object within the mass of powdered build material.

An additive manufacturing system is also described. The additive manufacturing system includes a build material distributor to deposit layers of powdered build material onto a bed. An agent distributor of the additive manufacturing system selectively distributes a fusing agent onto layers of the powdered build material to selectively solidify portions of a layer of building material to form a three-dimensional (3D) printed object. A compound distributor of the additive manufacturing system selectively distributes a conductive compound onto layers of the build material to form at least one resonator associated with the 3D printed object. The additive manufacturing system also includes a recorder to record a pose of the resonator relative to the 3D printed object. The recorded pose of the resonator within the 3D printed object facilitates determination of the pose of the 3D printed object within a mass of powdered build material.

Such systems and methods 1) allow identification of a part, or object, hidden in encompassing material such as a powdered build material; 2) allow for a determination of the pose of a part hidden in the powdered build material; 3) trigger access to precise data associated with a hidden part, such as dimensional data; 4) trigger subsequent cleaning, assembly, or other operations based on the precisely identified part within the mass; 5) conserves build material by not allocating additional build volume for identification and location information; 6) in some examples precludes incorporation of foreign identification device; and 7) can implement any type of resonator, which could be small hollow volumes with acoustic resonances tuned to specific frequencies and shaped for gain that varies depending on the direction of incident energy. However, it is contemplated that the devices disclosed herein may address other matters and deficiencies in a number of technical areas.

As used in the present specification and in the appended claims, the term "pose" refers to an identification of various positional characteristics of the object. For example, a pose may include a position along three axes (x, y, and z) of a reference frame as well as rotation about those axes (pitch, yaw, and roll).

Moreover, as used in the present specification and in the appended claims, the term "conductive" refers to a material that is electrically semi-conductive or electrically conductive.

Figure 1:
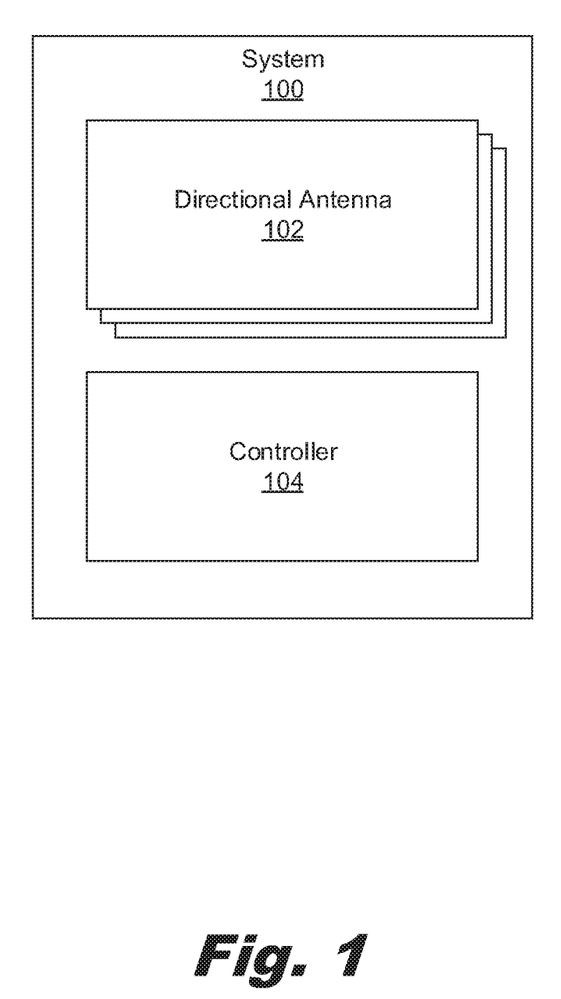
FIG. 1 is a block diagram of a system for resonator-based object pose determination, according to an example of the principles described herein.

Turning now to the figures, FIG. 1 is a block diagram of a system (100) for resonator-based object pose determination, according to an example of the principles described herein. In some examples, the system (100) may form part of a post-printing system. For example, once a three-dimensional (3D) object is printed, a mass in which it is disposed may be removed, either manually or by an automated device, from the additive manufacturing system and passed to a post-printing system such as a cleaning station. There the system (100) may operate to determine the pose of the 3D printed object within the mass such that subsequent operations on the 3D printed object may be carried out.

The system (100) includes at least one directional antenna (102). In some examples, the directional antenna(s) (102) may be stationary relative to a stage. In other examples, the directional antenna(s) (102) rotate about the 3D printed object of interest. The directional antenna(s) (102) may emit energy at any of a variety of frequencies. Specifically, the directional antenna(s) may emit various forms of electromagnetic radiation, which may include infrared light, laser light, or other forms of suitable electromagnetic radiation. For example, the 3D printed object may be interrogated by exposing it to a wide band of energy, for example frequencies between 40 gigahertz (GHz) and 50 GHz. The 3D printed object includes a resonator, which preferentially reflects energy in a certain frequency band of electromagnetic waves. That is, the structure of the resonator creates energy waves which are reflected towards the directional antenna (FIG. 1, 102). As will be described below, the resonator, will reflect energy at certain resonant frequencies, which resonant frequencies are received at the directional antenna(s) (102) and used to determine resonator identity and location. The identity and location of the resonator allow a determination of the object identity and location.

In summary, the directional antenna(s) (102) emit energy waves towards a mass in which an object is disposed. As described above, the 3D printed object includes an associated resonator that is disposed on, in or nearby the 3D printed object that reflects signals towards the directional antenna(s) (102). The mass is moved about relative to the directional antenna(s) (102). For example, the directional antenna(s) (102) may be disposed on a stage, and a movement device such as a robotic arm may move the mass about the stage. As the mass is moved, the orientation of the resonator relative to the direction antenna(s) (102) changes. This change in orientation affects the strength, and potentially the polarization, of the received reflected signal. Based on the characteristics of the received reflected signal, the system (100) may determine a pose of the 3D printed object. For example, when the resonator's axis of maximum reflection is coaxial with a directional antenna (102), a strongest signal is expected. When this strongest value is obtained, the system (100) determines that alignment between the resonator and directional antenna (102) exists and therefore knows a portion of the pose of the resonator relative to the directional antenna (102). Additional movements of the mass allow for a determination of the full pose of the resonator relative to the directional antenna (102).

The controller (104) of the system (100) then determines a pose of the object within the mass based on the received reflected signals. For example, once the resonator is aligned with a directional antenna (102), as indicated by the maximum reflected signal, a relative pose of the resonator to the directional antenna (102) is determined. Moreover, as the pose of the resonator relative to the 3D printed object is predetermined, a pose of the 3D printed object relative to the directional antenna (102) can be determined. In some examples, the controller (104) accesses a database that includes information on various 3D printed objects that have been made. For example, the database may include a library of dimensions of 3D printed objects. The database may also indicate where, within each 3D printed object, a resonator is disposed. As will be described below, in some examples, the location of the resonator within the 3D printed object may be determined by a recorder of an additive manufacturing system, which is distinct from the present system (100) which determines the pose of the 3D printed object within the mass. That is, knowing the exact pose of the resonator in the mass, via operation of the system (100), and knowing the exact pose of the resonator in the object, via the database and a recorder of an additive manufacturing system for example, the exact pose of the object in the mass may be determined.

As described above, the determination of the pose of the object within the mass may be done by tracking the received reflected signals. That is, the controller (104) may have a real-time tracking of the intensity, frequency, and/or direction of received reflected signal. By tracking all received signals, a maximum value can be determined, which maximum value indicates alignment of the resonator with the directional antenna (102) thus providing the exact location of the resonator in the mass. A specific example of determining the maximum received reflected signal, and thereby the pose of the object in the mass, is provided below in connection with FIGS. 5A-5F.

In addition to determining the pose of the object within the mass, the directional antenna(s) (102) and controller (104) may also determine, again based on the received reflected signals, an identifier of the object. That is, the resonator associated with the object may be formed to have one or multiple resonant frequencies. Accordingly, when interrogated by the particular energy, just those frequencies that match the resonate frequencies of the resonator will be reflected and received at the directional antenna(s) (102). Multiple received frequencies form a signature for a particular resonator. This signature serves to uniquely identify a particular resonator and its associated object. A specific example of identifying a part based on the resonant frequency of the resonator is described below in connection with FIGS. 5A-5F.

Thus, the present system (100) allows for identification of a pose of a 3D printed object. Such a pose may include six value coordinates such as a displacement along the X axis, a displacement along the Y axis, a displacement along the X axis, an angular rotation about the Z axis, an angular rotation about the X axis, and an angular rotation about the Y axis, within a mass by receiving a signal reflected off a resonator that is disposed at a predetermined location within the 3D printed object.

Figure 2:
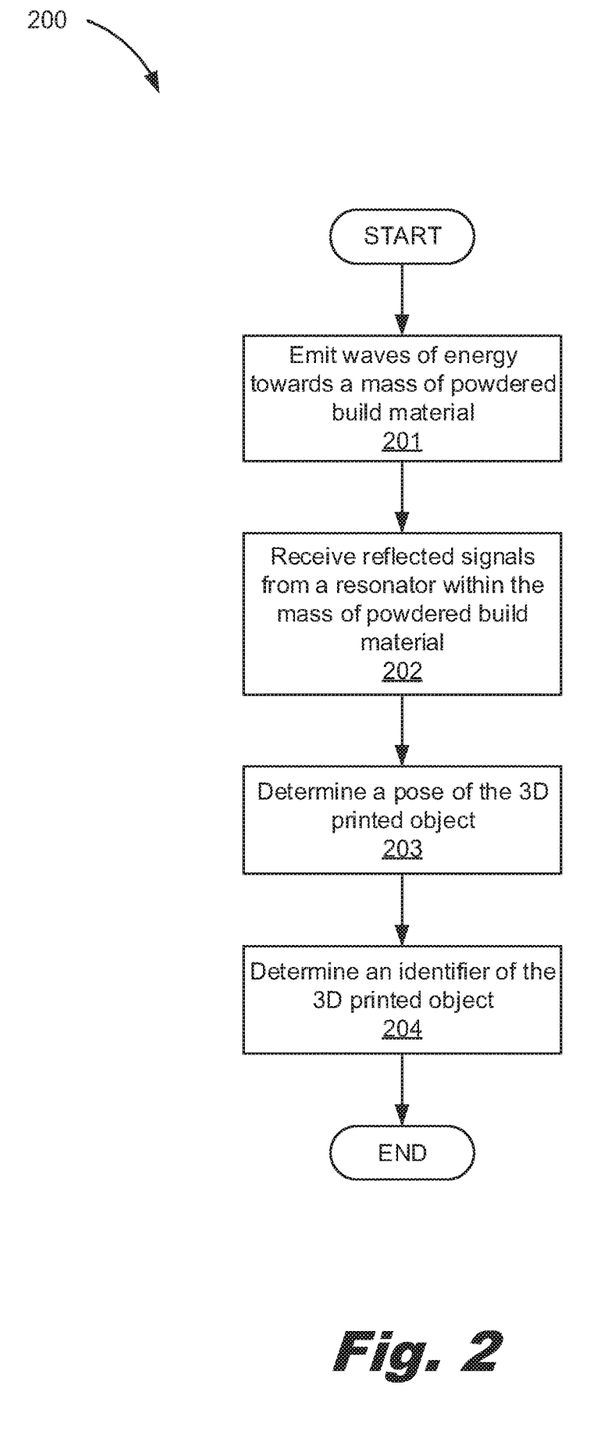
FIG. 2 is a flow chart of a method for resonator-based object pose determination, according to an example of the principles described herein.

FIG. 2 is a flow chart of a method (200) for resonator-based object pose determination, according to an example of the principles described herein. According to the method (200), waves of energy are emitted (block 201) from a directional antenna (FIG. 1, 102) towards a mass of powdered build material. As described above, the mass of powdered build material conceals an object, such as a 3D printed object. The powdered build material, while opaque, may be transparent to the energy transmitted by the at least one directional antenna (FIG. 1, 102). In some examples, the directional antenna (FIG. 1, 102) may be a broadband antenna capable of emitting (block 201) waves at various frequencies. The frequencies at which the waves are emitted (block 201) may be selected based on the resonator disposed within the part. For example, as described above, the directional antenna (FIG. 1, 102) may emit energy at various frequencies between 40 GHz and 50 GHz. Based on those frequencies that are reflected, or resonated from the mass, a pose of an object may be determined.

That is, the mass includes resonators. These resonators are placed in the mass and may be in, on, or nearby the 3D printed object concealed within. As described above, the resonators generate waves when exposed to a certain frequency. For example, a resonator may be an electromagnetic resonator that preferentially reflects energy in a certain frequency band of electromagnetic waves. The structure of the resonator creates energy waves which are reflected towards the directional antenna (FIG. 1, 102). That is, the directional antenna(s) (FIG. 1, 102) receive (block 202) reflected signals from the at least one resonator disposed within the mass of powdered build material. While specific reference is made to electromagnetic resonators, other types of resonators may be implemented as well. For example, the resonators may be acoustic resonators. An acoustic resonator may be formed as a specially shaped air-filled cavity within the object.

In particular, the directional antenna(s) (FIG. 1, 102) receive (block 202) reflected signals as the mass is moved relative to the directional antenna (FIG. 1, 102). That is, the characteristics of the reflected signal, such as its intensity, frequency, and polarization, change based on changes in position, orientation, and angular attitude relative to the directional antenna(s) (FIG. 1, 102). These changes can be used to determine where on the stage and within the mass, the 3D printed object is located. In some examples, reflected signals are received (block 202) from one resonator at a predisposed pose relative to the 3D printed object. However, in other examples, reflected signals are received from multiple resonators at predetermined poses relative to the 3D printed object.

Accordingly, based on the received reflected signals, the controller (FIG. 1, 104) determines (block 203) a pose of the 3D printed object within a mass of the powdered build material and in some examples determines (block 204) an identifier of the 3D printed object. As described above, determining (block 203) a pose of the 3D printed object may be based on feedback regarding a strength of the received reflected signal. That is, a strongest received signal from a resonator indicates that the resonator is aligned with a directional antenna (FIG. 1, 102). Such alignment, when combined with information about a predetermined resonator-to-object pose, allows precise determination of the pose of the 3D printed object within the mass of powdered build material, an example of which is provided below in connection with FIGS. 5A-5F.

Determining (block 203) an identifier of the 3D printed object may include identifying a unique resonant frequency signature of the resonator disposed in the 3D printed object. That is, the directional antenna(s) (FIG. 1, 102) and controller (FIG. 1, 104) may be able to distinguish between different frequencies. This sensitivity to frequencies allows for identification of parts. That is, characteristics of the resonator may be customized such that the resonator resonates, or reflects signals, at particular frequencies. These different resonate frequencies of the resonator create a frequency signature that can be used to determine an identify of an object. For example, consider a first 3D printed object with a resonator that is tuned to 45 GHz, 47 GHz, and 49 GHz. Determining (block 203) an identifier of the 3D printed object then includes receiving these different resonant signals, mapping them to these particular frequencies, and consulting a database that indicates these three signals identify the object as "Part A."

Such a system may also allow for distinction of multiple 3D printed objects within a build material mass. That is, continuing the above example, presume a second 3D printed object has a resonator that is tuned to 41 GHz, 44 GHz, and 46 GHz. The different reflected signals, which may be frequencies themselves, are received at the directional antenna(s) (FIG. 1, 102) and mapped to determine which parts are positioned within the stage. That is, the reflected energy identifies whether a particular part corresponds to the first set of resonant frequencies or the second set of resonant frequencies. Thus, parts can be distinguished and uniquely processed, i.e., cleaned, based on the characteristics of that part.

Figure 3:
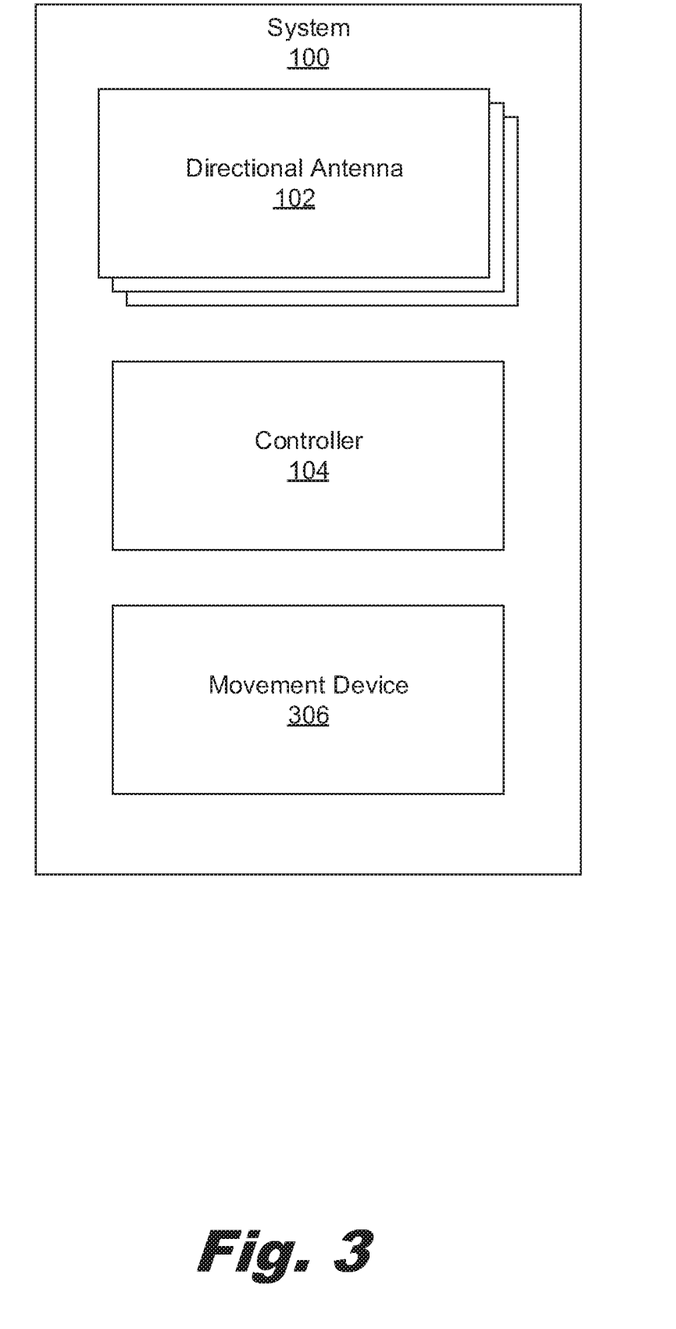
FIG. 3 is a block diagram of a system for resonator-based object pose determination, according to another example of the principles described herein.

FIG. 3 is a block diagram of a system (100) for resonator-based object pose determination, according to another example of the principles described herein. As in the system (100) depicted in FIG. 1, the system (100) depicted in FIG. 3 includes at least one directional antenna (102) and a controller (104).

In this example, the system (100) also includes a movement device (306) to move the mass of powdered built material relative to a stage. That is, as described above, the received signal from a resonator in the object/mass changes based on the relative pose of the resonator to the directional antenna(s) (102). Accordingly, the movement device (306) moves the mass such that the signal changes, which change in signal aids in the determination of object pose within the mass of powdered build material.

In some examples, the movement device (306) may be a moveable platform on the stage. That is, the movable platform may be able to move in any number of directions relative to the directional antenna(s) (102). In some examples, the movement device (306) may be a robotic arm that grips the mass and moves it. In another example, the movement device (306) moves the directional antenna (102). That is, the movement (306) alters the relative position of the mass relative to the directional antenna (102) by either moving the mass relative to a stationary directional antenna (102), or moving a directional antenna (102) relative to a stationary mass.

The movement of the movement device (306) may be managed by the controller (104). That is, the controller (104) may converge the object towards alignment with the directional antenna(s) (102). As described above, alignment may be identified by a largest received reflected signal. Accordingly, in an example, the controller (104) may control movement of the movement device (306) along a particular direction so long as the received reflected signal continues to increase in strength. Once the received signal drops in intensity from a previous measurement, the controller (104) may move the movement device (306) in the opposite direction. Thus, the controller (104) converges the object towards a position where the strongest signal is received, which position is indicative of an alignment of the resonator with a directional antenna (102).

In some examples, the controller (104) has additional functionality. For example, the controller (104) may trigger at least one post-processing operation based on a determined pose and identifier. That is, the system (100) may include, or be coupled to a post-processing device that performs some post-processing operation.

For example, the post processing device may be a robotic device that grips the object and/or that cleans the object.

Such cleaning may be performed by an air stream, a brush, or any number of other cleaning devices. Accordingly, in this example, the controller (104) may trigger object cleaning.

The post processing operation may be an object handling operation. For example, once a full pose of the 3D printed object within the mass is known, a manipulator robot can precisely grasp the 3D printed object appropriately without accidentally damaging it. Accordingly, such a system avoids needing to use a manipulator arm with high-precision active force sensors giving feedback from its gripper components.

Then, as described above, the pose can be used to position a cleaning device, such as a sand-blaster, appropriately with respect to the object since cake-ablation rate is dependent upon the distance between the sand-blaster and the surface of the object. If the sand-blaster is too close to the surface, especially when it's a delicate part, it may ablate away portions of the 3D printed part (not just unfused powder) or can destroy fragile portions of the 3D printed object. Accordingly, the operation of determining a pose of the 3D printed object within the mass allows for precise and correct post-processing operations to be executed without damaging the 3D printed object itself.

In an example, the post processing device may be a processor that acquires object-specific data. For example, as described above, a database may exist that includes detailed information on an object, such as its dimensions. Such dimensions may be used in subsequent processing. For example, a width of the object may indicate the positioning of a cleaning brush, or may dictate where an air brush is to be positioned to maximize its cleaning effect. Accordingly, the controller (104) may trigger such a retrieval of object-specific data.

As other examples, the post-processing operation that is triggered may be a machining operation, such as forming holes or joining multiple parts together. In another example, the post-processing operation may be a finishing operation aside from cleaning, such as sanding or polishing. While particular reference is made to a few post-processing operations, the controller (104) may trigger any number and combination of those specific post-processing operations described plus additional post-processing operations. That is, the system (100) by locating and identifying a particular object based on an embedded resonator may facilitate precise and delicate post processing operations.

Figure 4:
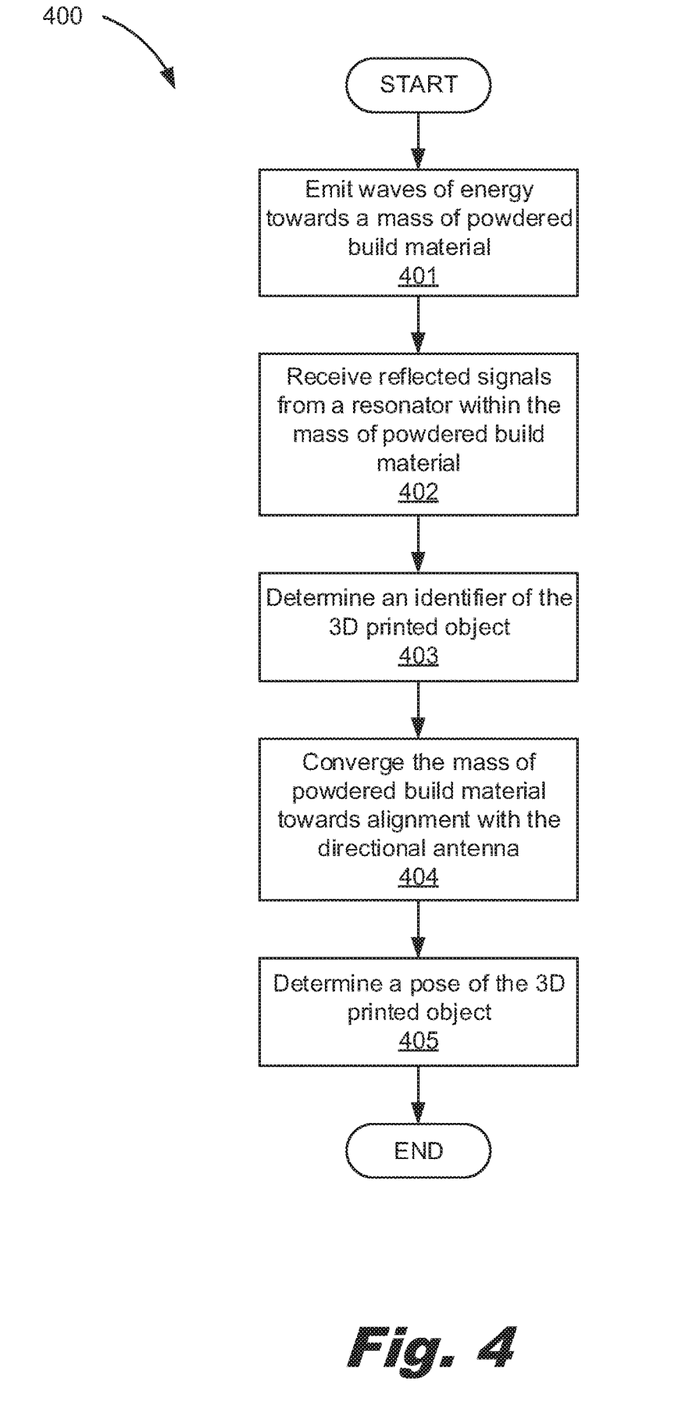
FIG. 4 is a flow chart of a method for resonator-based object pose determination, according to another example of the principles described herein.

FIG. 4 is a flow chart of a method (400) for resonator-based object pose determination, according to another example of the principles described herein. According to the method (400), waves of energy are emitted (block 401) towards a mass of powdered build material and reflected signals are received (block 402) from resonators disposed within the mass of powdered build material. From this reflected signal, an identifier (block 403) of the 3D printed object is obtained. These operations may be performed as described in connection with FIG. 2.

As described above, the controller (FIG. 1, 104) may control a movement device (FIG. 3, 306) to converge (block 404) the mass of powdered build material towards alignment with a directional antenna (FIG. 1, 102). As described above, such an operation may be based on feedback from the directional antenna(s) (FIG. 1, 102). That is, a directional antenna (FIG. 1, 102) may receive signals of varying intensity. If an intensity of a received signal increases as the movement device (FIG. 3, 306), and associated object, are moved in a particular direction, then the controller (FIG. 1, 104) continues to move the movement device (FIG. 3, 306) in this direction. Once the signal intensity drops, the controller (FIG. 1, 104) alters the path of travel such that a signal is again increased. In such a fashion, the controller (FIG. 1, 104) can change the movement of the mass of powdered build material until the resonator disposed on, in, or around the 3D printed object is aligned with the directional antenna (FIG. 1, 102).

In some examples, the convergence (block 404) may be incremental and systematic along different directions of travel. For example, the mass of powdered build material may first be rotated and translated until the resonator axis of maximum reflection is parallel with the directional antenna (FIG. 1, 102). The parallelism of the two components can be determined by determining the largest received reflected signal during the rotation.

Next, the mass may be translated until the resonator is coaxial with the directional antenna (FIG. 1, 102). The coaxial state may be determined again, by determining the largest received reflected signal during rotation. After such a convergence (block 404) a pose of the 3D printed object is determined (block 405).

Figure 5A:
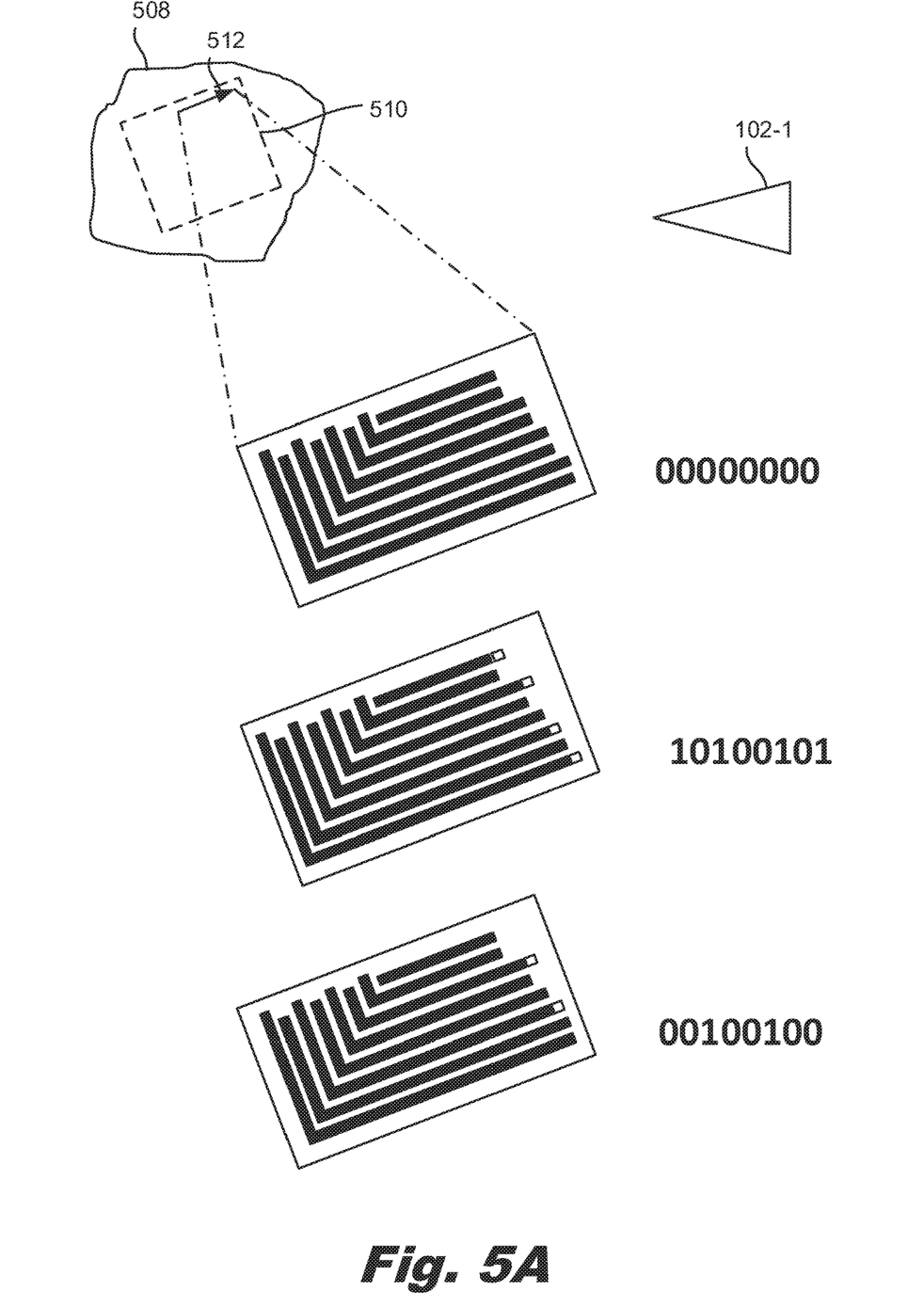
FIGS. 5A-5F depict movement of the mass relative to a directional antenna, according to an example of the principles described herein.
Figure 5B:
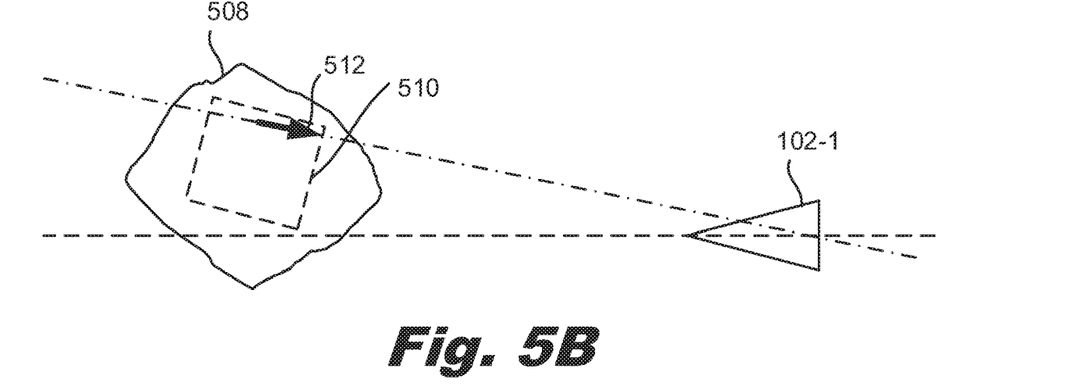
Figure 5C:
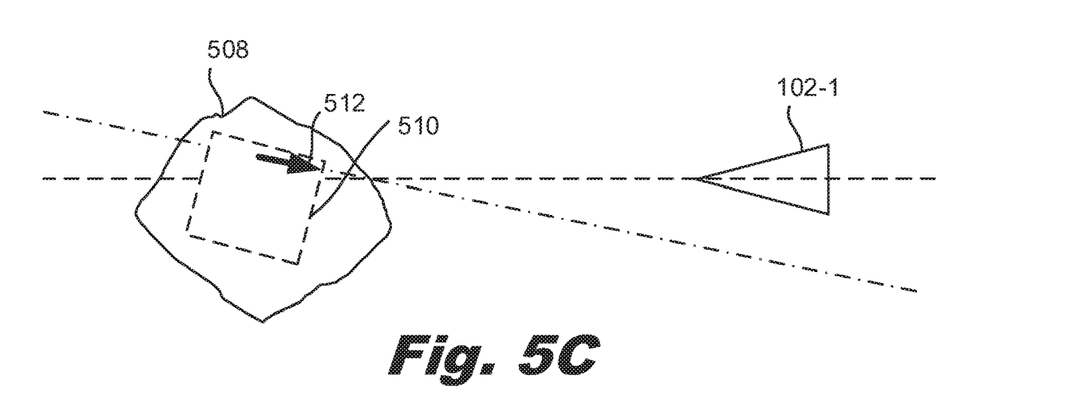
Figure 5D:
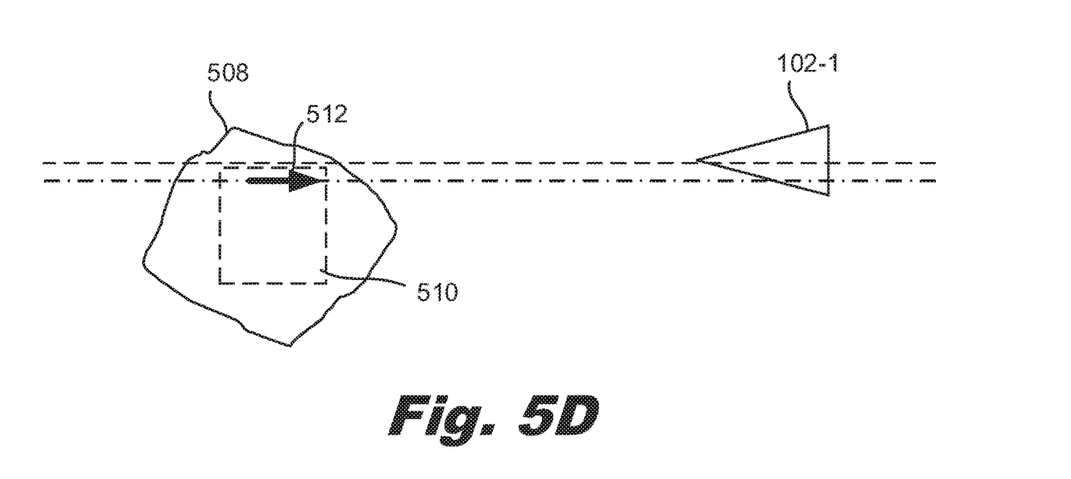
Figure 5E:
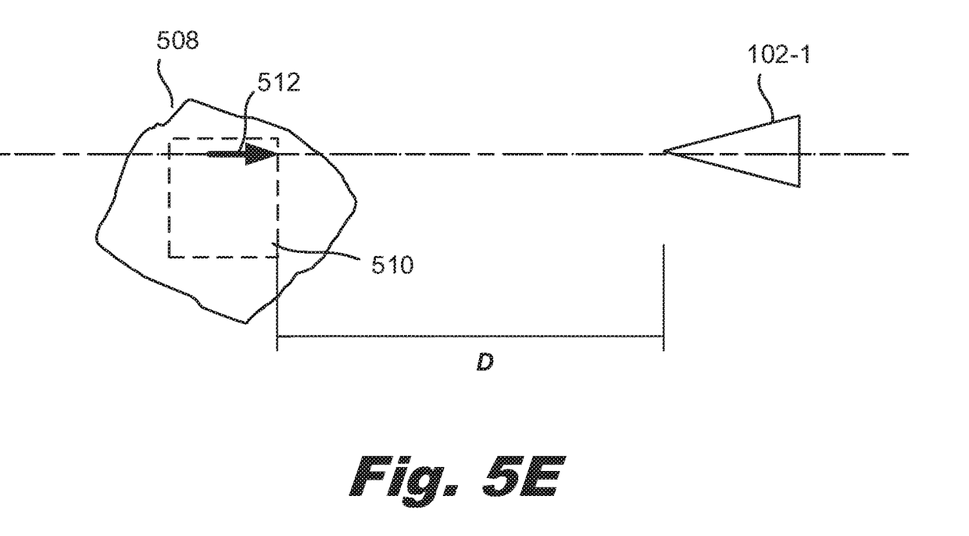
Figure 5F:
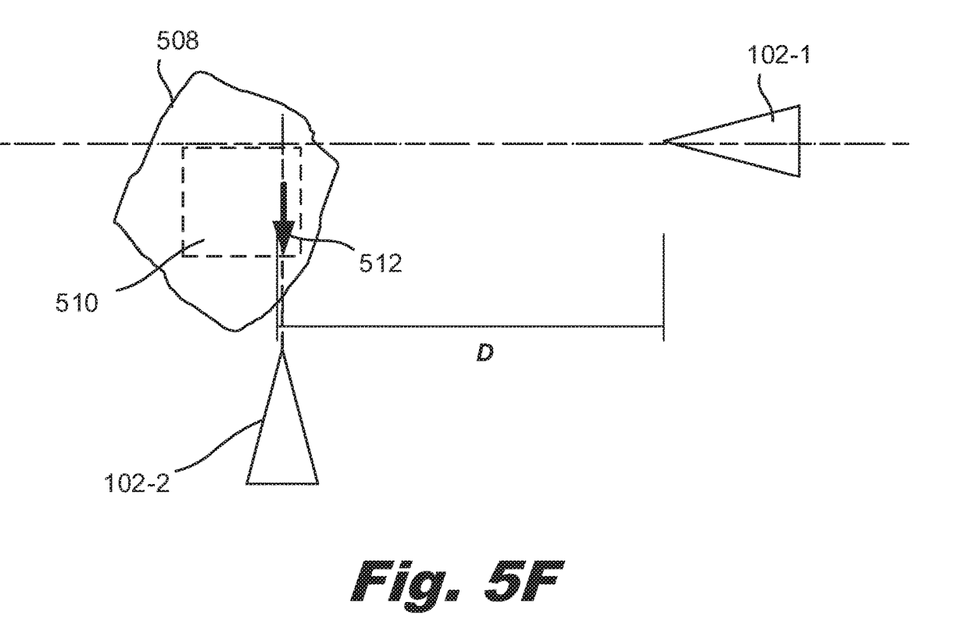

FIGS. 5A and 5F depict movement of the mass (508) relative to directional antennas (102), according to an example of the principles described herein. FIG. 5A also depicts different configurations of a resonator (512) that may be implemented in a 3D printed object (510).

Specifically, as mentioned above, during formation of a 3D printed object (510), the 3D printed object (510) may become concealed in a mass (508) of powdered build material. However, because the location of a resonator (512) is predetermined relative to the 3D printed object (510), an identification of the pose of the resonator (512) relative to the mass (508) allows for a determination of the pose of the 3D printed object (510) within the mass (508). In FIGS. 5A-5F, the representation of the 3D printed object (510) in dashed lines indicates its location within, and thereby hidden within, the mass (508).

The resonator (512) in the 3D printed object (510) may take many forms. In one example, a resonator (512), either two-dimensional or three-dimensional, may be formed on the 3D printed object (510) by depositing a conductive compound into the powder bed during the additive manufacturing process. Such a resonator (512) may be directional and have a measured gain signature depending on a plane of operation and angle of measurement. In another example, the resonator (512) may be a flat spiral, wherein signals are obtained by inductively coupling the resonator (512) to the directional antenna (102).

In yet another example, the resonator (512) may be an L-shaped resonator (512) as depicted in FIG. 5A. In this example, the dark lines may be conductive and may reflect a higher intensity signal when the long lengths of the resonator (512) legs are pointed towards the directional antenna (102-1).

The above examples describe how a resonator (512) may be formed during an additive manufacturing process, however the resonator (512) may be added in a number of other ways. For example, the system (FIG. 1, 100) may include a pick and place tool that picks an independent resonator (512) and places it in the build material during manufacture. That is, between the formation of adjacent layers, the build process may be temporarily paused such that an external resonator (512) may be inserted. In other words, at least one resonator (512) may be added inside a 3D printed object (510), on the surface of the 3D printed object (510), or near a 3D printed object (510) that will eventually be obscured inside a mass (508). This can be done by altering a build file for the 3D printed object (510) such that the resonator is formed via the additive manufacturing system during the formation of the 3D printed object (510), or by embedding a resonator (512) into the 3D printed object (510) via a pick and place tool. In either case, the poses of the resonators (512) relative to the 3D printed object (510) of interest are recorded.

As described above, the resonator (512) may not only be used to determine a 3D printed object (510) pose, but also to identify the 3D printed object (510), for example based on resonant frequency. Given the L-shaped resonator (512) example depicted in FIG. 5A, the different length of legs may alter the signature of the resonant frequency peaks of the resonator (512). For example, in a first instance, where pairs of legs match in length, the resonant frequency signature may map to an address of "00000000" which may be used to identify a part. In a second instance, certain of the pairs of legs may be made longer as indicated by the white squares at the end of some legs, thus altering their resonant frequency, thus altering the mapping. In the second instance, the resonate frequency signature associated with the certain lengthened legs may map to an address of "10100101." As another example, different legs may be lengthened to map to a different address of "00100100." In other words, varying the properties of the resonator (512) may alter the resonant frequency that is used to identify a particular 3D printed object (510). While FIG. 5A depicts a particular type of resonator (512), other types of resonators (512) may be used as well. Different types of adjustments may be made to these other types of resonators (512) to adjust their resonating frequencies or other reflected signal attributes.

In FIGS. 5A-5F, the resonator (512) is depicted as an arrow, the head of the arrow being an axis of maximum resonance, which in the case of an L-shaped resonator (512) may be an axis of a long leg of the resonator (512). That is, when stimulated with energy, arriving towards the arrow head, the arrow points along the vector of maximum reflected energy. In some examples, the resonator (512) reflects with asymmetric polarization, thus allowing a directional antenna (102-1) to determine rotational attitude of the resonator (512) about the axis of maximum reflection.

The directional antenna (102-1) depicted in FIGS. 5A-5F emits radiation in the indicated direction and is most sensitive to received radiation arriving from the vector opposite the emission vector. As the resonator (512) reflects with asymmetric polarization, the directional antenna (102-1) may be able to detect polarization of reflected radiation. That is, reflected energy is polarized and highly dependent upon the orientation of the 3D printed object (510). The 3D printed object (510) can therefore be moved and rotated in front of a receiving directional antenna (102-1) until a maximum return signal is obtained. In the case of an L-shaped resonator (512), this will be when the long axis of the L is pointing at the receiving directional antenna (102-1). A rotation of the 3D printed object (510), about the axis of maximum reflected energy, can then be determined by examining the polarization of the reflected signal. In some examples, multiple measurements can be taken, possibly moving the 3D printed object (510) between measurements, to statistically enhance signal to noise ratio and therefore enhance accuracy and precision of the calculated pose of the 3D printed object (510) relative to the directional antenna (102-1).

Returning to the example, as depicted in FIG. 5A, the pose of the resonator (512) inside the mass (508) is unknown. However, the pose of the resonator (512) relative to the 3D printed object (510) and the pose of the mass (508) relative to the directional antenna (102-1) is known. Using a process of rotation and translation of the mass (508) relative to the directional antenna (102-1), the relative pose of the resonator (512) to the 3D printed object (510) may be determined through a convergence process.

That is, as depicted in FIG. 5B, the mass (508), along with the embedded 3D printed object (510) and resonator (512), may be rotated to more closely align with the directional antenna (102-1). As depicted in FIGS. 5C and 5D, the mass (508) is translated along, and rotated about, an axis perpendicular to the directional antenna (102-1) axis of maximum sensitivity. This is repeated until the max signal is found. That is, the mass (508) is rotated and translated until the resonator (512) is parallel with the directional antenna (102-1) as depicted in FIG. 5D. The parallelism of the resonator (512) and the directional antenna (102) would be indicated by a largest received reflected signal.

Next, as shown in FIG. 5E, the mass (508) of powdered build material is translated until the resonator (512) is coaxial with the first directional antenna (102-1) as depicted in FIG. 5E. While specific reference is made to translation to align the first directional antenna (102-1) with the resonator (512), other movements, such as a spiral search, may be carried out to align these components. Again, coaxial as opposed to any other parallel orientation, is indicated by the largest received reflected signal for this stage. Because the resonator (512) signal is polarized and the directional antenna (102-1) can detect polarization of the signal, the received signal can be analyzed for polarization to determine a rotation of the 3D printed object (510) about the coaxial axis of the resonator (512) and the first directional antenna (102-1). At this stage, just the distance "D" between the first directional antenna (102-1) and the resonator (512) is unknown. As with the first directional antennal (102-1), this second directional antenna (102-2) can detect polarization of the signal. Accordingly, the received signal can be analyzed for polarization to determine a rotation of the 3D printed object (510) about the coaxial axis of the resonator (512) and the second directional antenna (102-2).

Accordingly, in some examples, a second directional antenna (102-2) may be used. That is, in this example, the at least one directional antenna (102) includes a first directional antenna (102-1) and a second directional antenna (102-2) to determine a distance between the resonator (512) and the first directional antenna (102-1) as depicted in FIG. 5F. Specifically, the second directional antenna (102-2) may have a sensitivity axis that is perpendicular to the sensitivity axis of the first directional antenna (102-1). In this example, after achieving coaxial alignment with the first directional antenna (102-1), the mass (508) is rotated 90 degrees such that the resonator (512) is parallel with, and pointing generally towards, the second directional antenna (102-2) axis of maximum sensitivity. The mass (508) is then translated parallel to the sensitivity axis of the first directional antenna (102-1). Again, at the point of maximum signal strength detected on the second directional antenna (102-2) the movement of the mass (508) is stopped. At such a point, the resonator (512) is coaxial with the second directional antenna (102-2). As the pose between the first antenna (102-1) and the second antenna (102-2) is known, the distance between the resonator (512) and the first directional antenna (102-1) may be determined. In summary, the resonator (512) is aligned with the second directional antenna (102-2) which is perpendicular to the first directional antenna (102-1) to determine a distance between the resonator (512) and the first directional antenna (102-1).

FIGS. 5A-5F depict the finding of the pose in two-dimensions. A similar process may be used to find the pose of the 3D printed object (510) in three dimensions. Specifically, as depicted in FIG. 5D, the mass (508) is maneuvered and converged such that the resonator (512) is co-axial with the first directional antenna (102-1). This provides multiple components of the resonator (512) pose. Specifically, when the resonator (512) is polarized, a roll, pitch, and yaw of the resonator (512) relative to the first directional antenna (102-1). In the orientation depicted in FIG. 5D, roll is the angular attitude of the resonator (512) seen as a rotation about the co-axis, which is measured from a polarized return signal. Yaw and pitch are determined because in this configuration the resonator (512) axis is parallel to the first directional antenna (102-1) axis, and the pitch and yaw of the first directional antenna (102-1) are known.

At this stage, 2 of the three translational degrees of freedom are also determined. That is, a position in the plane that is orthogonal to an axis of the resonator (512), which is the same as the first directional antenna (102-1) in FIG. 5E. Accordingly, what remains undetermined is the distance from the resonator (512) to the first directional antenna (102-1). Then as depicted in FIG. 5F, the mass (508) is rotated, and a second directional antenna (102-2), or a repositioned first directional antenna (102-1) is used to determine the distance from the first directional antenna (102-1) to the resonator (512).

In the 3D environment, a more persistent search of coaxiality to the first directional antenna (102-1) may include sweeping the mass (508) in a raster fashion across the first directional antenna (102-1), recording reflected signal strength over a matrix of points blanketing the surface of the mass (508) that is presented to the first directional antenna (102-1). A point of maximum signal strength is determined which coincides with coaxiality between the first directional antenna (102-1) and the resonator (512) in a 3D environment. In some examples, a set of micro movements and measurements improve the convergence.

As in the 2D case, if there is polarization, this first coaxality allows us to know roll, pitch, and yaw of the resonator (512) relative to the first directional antenna (102-1).

However, even without polarization, an exact pose may be determined. That is, if the signal is not polarized, or the antennas (102) cannot detect polarization, at the stage depicted in FIG. 5E, no rotation relative to the co-axis would be known. In this example, an additional resonator (512) may be embedded in the mass (508), which second resonator (512) may have an axis of maximum reflection that is orthogonal to the axis of the first resonator (512).

Figure 6:
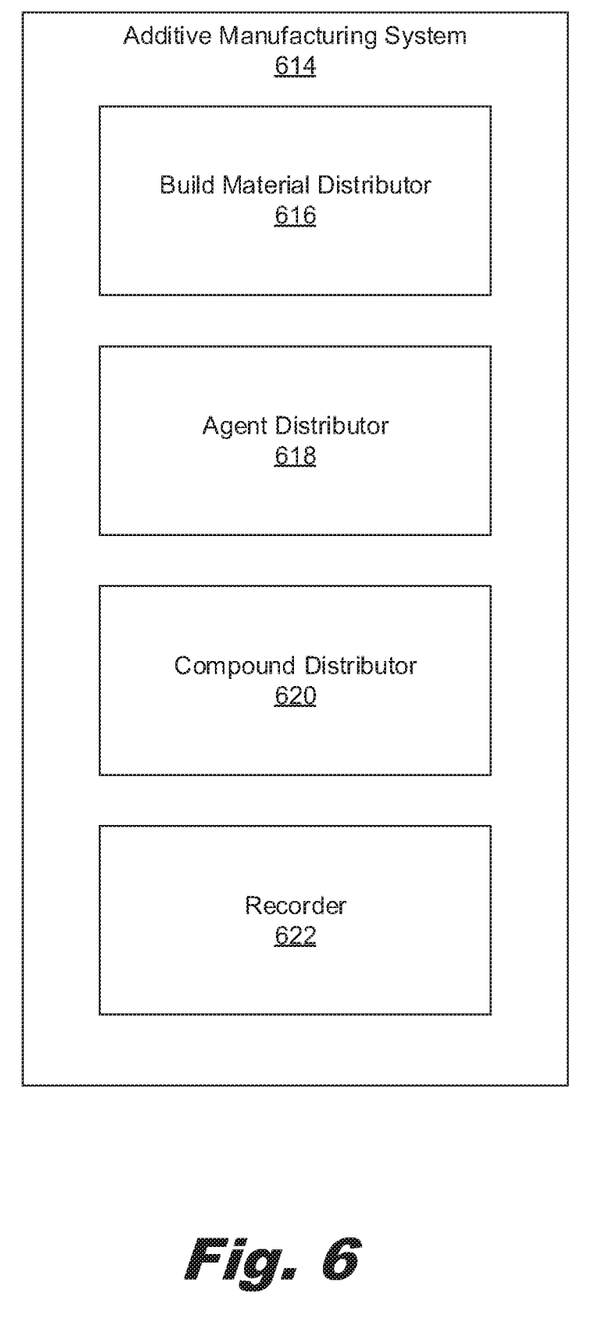
FIG. 6 is a block diagram of an additive manufacturing system for resonator-based object pose determination, according to another example of the principles described herein.

Accordingly, after alignment with the first directional antenna (102-1) as depicted in FIG. 5E, the mass (508) is spun about the co-axis. A second directional antenna (102-2) or a re-positioned first antenna (102-1) is then used to search for the maximum reflected signal. This may be done by translating the second directional antenna (102-2) parallel to the co-axis. At the point of maximum reflected signal, the second resonator (512) will be coaxial with the second directional antenna (102-2), or the repositioned first directional antenna (102-1). Because the relative pose of the second resonator (512) with respect to the first resonator (512) is known, the previously undetermined roll (about the axis of first directional antenna (102-1)) is known. We also know the previously unknown distance from the first directional antenna (102-1). FIG. 6 is a simplified top diagram of an additive manufacturing system (614), according to an example of the principles described herein. In general, apparatuses for generating three-dimensional objects may be referred to as additive manufacturing systems (614). The additive manufacturing system (614) described herein may correspond to three-dimensional printing systems, which may also be referred to as three-dimensional printers.

As described above, in the additive manufacturing process, a fusing agent may be selectively distributed on the layer of build material in a pattern of a layer of a three-dimensional object. An energy source may temporarily apply energy to the layer of build material. The energy can be absorbed selectively into patterned areas formed by the fusing agent versus blank areas that have no fusing agent, which leads to the components to selectively fuse together. This process is then repeated until a complete physical object has been formed.

In examples described herein, a build material may include a powder-based build material, where the powder-based build material may include wet and/or dry powder-based materials, particulate materials, and/or granular materials. In some examples, the build material may be a polymer. In some examples, the build material may be a thermoplastic. Furthermore, as described herein, the functional agent may include liquids that may facilitate fusing of build material when energy is applied. The fusing agent may be a light absorbing liquid, an infrared or near infrared absorbing liquid, such as one containing a pigment in aqueous dispersion.

The additive manufacturing system (614) includes a build material distributor (616) to successively deposit layers of the build material onto a bed. In some examples, the build material distributor (616) may be coupled to a scanning carriage. In operation, the build material distributor (616) places build material on the bed as the scanning carriage moves over the bed.

The additive manufacturing system (614) includes an agent distributor (618) to selectively distribute a fusing agent onto layers of the powdered build material to selectively solidify portions of a layer of building material to form a 3D printed object (FIG. 5A, 510). In some examples, the agent distributor (618) is coupled to a scanning carriage that moves along a scanning axis over the bed.

In addition to ejecting the fusing agent, the additive manufacturing system (614) may selectively distribute other agents such as a detailing agent. The ejection of the detailing agent may be by the agent distributor (618) or another distributor. As the fusing agent is used to determine which parts of the powdered build material are to be solidified to form the 3D printed part, the detailing agent is placed on portions of the powdered build material that are not to be solidified or other places that need thermal management. That is, the detailing agent can be used to ensure that those portions that are not to form the 3D printed part do not heat up to be either partially, or fully sintered.

An agent distributor (618) may be a liquid ejection device. A liquid ejection device may include at least one printhead (e.g., a thermal ejection based printhead, a piezoelectric ejection based printhead, etc.). In one example, printheads that are used in inkjet printing devices may be used as an agent distributor (618). In this example, the fusing agent may be a printing liquid. In other examples, an agent distributor (618) may include other types of liquid ejection devices that selectively eject small volumes of liquid.

The additive manufacturing system (614) may include other components such as a heater to selectively fuse portions of the build material to form an object (FIG. 5A, 510) via the application of energy to the build material. The heater may be a component that applies energy such as infrared lamps, visible halogen lamps, resistive heaters, light emitting diodes LEDs, and lasers. The heater may apply an amount of energy such that those portions with an increased absorption rate (due to the presence of fusing agent) reach a temperature greater than the fusing temperature while those portions that do not have the increased absorption rate to not reach a temperature greater than the fusing temperature.

The additive manufacturing system (614) also includes a compound distributor (620) to selectively distribute a compound onto layers of build material to form at least one resonator (FIG. 5A, 512) associated with the 3D printed object (FIG. 5A, 510). That is, the additive manufacturing system (614) which forms the 3D printed object (FIG. 5A, 510) may also be used to form the resonators (FIG. 5A, 512) used to determine 3D printed object (FIG. 5A, 510) pose and identity within a mass (FIG. 5A, 508).

The compound distributor (620) may deposit a variety of conductive materials to form the resonator (FIG. 5A, 512). For example, the print compound could be a metal-impregnated metal ink.

The metal-impregnated ink can be selectively deposited into any portion of the printed part as desired, providing the ability to digitally address ink placement. This allows for the creation of a 2D or 3D contiguous structure within the printed part where metal has been selectively placed. With the appropriate processing, that structure can become conductive and able to resonate with radiated electromagnetic energy, thereby creating a structure that acts as a transmitting antenna within the printed part. By creating the appropriate 3D form, the created antenna can be tuned to a targeted electromagnetic frequency range of interest.

In other examples, the compound that is used to form the resonators includes conductive or semi-conductive nanocarbons (graphene, CNTs, graphene nanoribbons), conductive and semi-conductive polymers (PEDOT:PSS, polythiophenes, polyacetylenes, poly(p-phenylene vinylene), etc.), conductive and semi-conductive non-carbonaceous 2D materials ($WS_2$, $WSe_2$, etc.) and conductive and semi-conductive nanoparticles (gold, silver, copper, III-V or II-VI semiconductors, etc.)

As with the agent distributor (618), the compound distributor (620) may be a liquid ejection device such as a thermal ejection based printhead, a piezoelectric ejection based printhead, or other type of liquid ejection device that selectively ejects small volumes of liquid.

The compound distributor (620) may form the at least one resonator (FIG. 5A, 512) in a variety of locations relative to the final 3D printed object (FIG. 5A, 510). For example, the resonator (FIG. 5A, 512) may be formed on an interior portion of the 3D printed object (FIG. 5A, 510) or on an exterior portion of the 3D printed object (FIG. 5A, 510). In yet another example, the resonator (FIG. 5A, 512) is not formed on the 3D printed object (FIG. 5A, 510) at all, but rather is disposed on a portion of the build material that is removed from the 3D printed object (FIG. 5A, 510). That is, the resonator (FIG. 5A, 512) may be placed at any location relative to the 3D printed object (FIG. 5A, 510) so long as its pose relative to the object is predetermined. While particular reference is made to formation of a single resonator (FIG. 5A, 512), in some examples, the compound distributor (620) forms multiple resonators (FIG. 5A, 512) in the build material. For example, in the case of non-polar resonators, multiple resonators may be relied on to determine the 6-degree pose of the resonator (FIG. 5A, 512) in a three-dimensional environment.

The resonators (FIG. 5A, 512) can be placed anywhere that they fit within the object. In some examples, the additive manufacturing system (614) or another system analyzes the geometry of the part and determines the appropriate placement of the resonators (FIG. 5A, 512) within the part. If it is determined that no appropriate location exists, then it could be determined that placement of the resonators (FIG. 5A, 512) on the surface of the part, or external to the part (but within the part "potato" region) would be desirable, and then they could be created there. In some examples if the resonators (FIG. 5A, 512) are external to the part, they may be connected to the 3D printed object (FIG. 5A, 510) by temporary support elements and removed as part of processing. As long as the resonator location is well-known, the pose of the part can be calculated with reference to them.

As described above, each resonator (FIG. 5A, 512) may have a unique combination of resonant frequencies to identify the resonator (FIG. 5A, 512) and its associated 3D printed object (FIG. 5A, 510). The unique resonant frequencies may be set by adjusting characteristics of the resonator (FIG. 5A, 512). For example, as has been described above, in an L-shaped resonator (FIG. 5A, 512), the different length of legs may alter the resonant frequency of the resonator (FIG. 5A, 512). Accordingly, the compound distributor (620) may deposit the ink in a particular pattern, defining legs of a particular length to result in a desired resonate frequency signature for that resonator (FIG. 5A, 512).

The additive manufacturing system (614) also includes a recorder (622) to record a pose of the resonator (FIG. 5A, 512) relative to the 3D printed object (FIG. 5A, 510). Note that the recorder (622) is not recording the pose of the 3D printed object (FIG. 5A, 510) inside the mass (FIG. 1A, 508), but is rather noting the predetermined pose of the resonator (FIG. 5A, 512) relative to the 3D printed object (FIG. 5A, 510). That is, as described above, the recorded pose of the resonator (FIG. 5A, 512) within the 3D printed object (FIG. 5A, 510) facilitates determination of the pose of the 3D printed object (FIG. 5A, 510) within a mass of the powdered build material.

The pose of the resonator (FIG. 5A, 512) within the 3D printed object (FIG. 5A, 510) may be recorded in any number of formats. For example, the pose may be indicated by its 6-value location information. That is, the pose may indicate an x, y, and z position relative to a reference point and a yaw, roll, and pitch about three orthogonal axes relative to a reference point. As described above, this precise location of the resonator (FIG. 5A, 512) may be recorded and later used to determine the pose of the object (FIG. 5A, 510) within the mass.

The characteristics of the resonators (FIG. 5A, 512) may also be recorded, such as an output response such that the signals from the resonators (FIG. 5A, 512) may be interpreted by the controller (FIG. 1, 104). Such characteristics may include a full 3D spatial resonated signal strength including polarization, all as a function of frequency.

Such systems and methods 1) allow identification of a part, or object, hidden in encompassing material such as a powdered build material; 2) allow for a determination of the pose of a part hidden in the powdered build material; 3) trigger access to precise data associated with a hidden part, such as dimensional data; 4) trigger subsequent cleaning, assembly, or other operations based on the precisely identified part within the mass; 5) conserves build material by not allocating additional build volume for identification and location information; 6) in some examples precludes incorporation of foreign identification device; and 7) can implement any type of resonator, which could be small hollow volumes with acoustic resonances tuned to specific frequencies and shaped for gain that varies depending on the direction of incident energy. However, it is contemplated that the devices disclosed herein may address other matters and deficiencies in a number of technical areas.

What is claimed is:

1. A system for determining a pose of an object within a mass, the system comprising:
at least one directional antenna to:
emit energy waves towards the mass in which the object is disposed; and
receive reflected signals from a resonator disposed in the mass as the mass is moved relative to the at least one directional antenna; and
a controller to, based on received reflected signals, determine the pose of the object within the mass.

2. The system of claim 1, wherein the controller determines, based on the received reflected signals, an identifier of the object.

3. The system of claim 2, wherein the controller triggers at least one post-processing operation based on the determined pose and the identifier.

4. The system of claim 3, wherein the at least one post-processing operation is selected from a group consisting of:
retrieval of object-specific data;
object cleaning;
a machining operation;
an object handing operation; and
a finishing operation.

5. The system of claim 1, wherein the controller determines the pose of the object within the mass by tracking the received reflected signals to identify a maximum value for the received reflected signals.

6. The system of claim 1, further comprising a movement device to move the mass relative to the at least one directional antenna based on an output of the controller to converge the resonator towards alignment with the at least one directional antenna, which alignment is identified by a largest received reflected signal.

7. The system of claim 1, wherein the at least one directional antenna comprises:
a first directional antenna; and
a second directional antenna to determine a distance between the object and the first directional antenna.

8. A method, comprising:
emitting waves of energy from a directional antenna towards a mass of powdered build material wherein a three-dimensional (3D) printed object is concealed;
receiving reflected signals from at least one resonator disposed within the mass of powdered build material as the mass is moved relative to the directional antenna; and
based on the received reflected signals:
determining an identifier of the 3D printed object; and
determining a pose of the 3D printed object within the mass of powdered build material.

9. The method of claim 8, wherein the received reflected signals are received from multiple resonators at predetermined poses relative to the 3D printed object.

10. The method of claim 8, further comprising converging the mass of powdered build material towards alignment with the directional antenna based on feedback from the directional antenna.

11. The method of claim 10, wherein converging the mass of powdered build material towards alignment with the directional antenna comprises:
rotating and translating the mass of powdered build material until the at least one resonator is parallel with the directional antenna;
translating the mass of powdered build material until the at least one resonator is coaxial with the directional antenna;
examining a polarization of the received reflected signals to determine a rotation of the 3D printed object relative to a coaxial axis; and
aligning the at least one resonator with a second directional antenna, which is perpendicular to the directional antenna, to determine a distance between the at least one resonator and the directional antenna.

12. An additive manufacturing system, comprising:
a build material distributor to deposit layers of powdered build material onto a bed;
an agent distributor to selectively distribute a fusing agent onto the layers of the powdered build material to selectively solidify portions of a layer of the powdered build material to form a slice of a three-dimensional (3D) printed object;
a compound distributor to selectively distribute a conductive compound onto the layers of the powdered build material to form at least one resonator associated with the 3D printed object; and
a recorder to record a pose of the at least one resonator relative to the 3D printed object, wherein the recorded pose of the at least one resonator within the 3D printed object facilitates determination of the pose of the 3D printed object within a mass of the powdered build material.

13. The additive manufacturing system of claim 12, wherein the at least one resonator is formed on at least one of:
an interior portion of the 3D printed object;
an exterior portion of the 3D printed object; and
a portion of the powdered build material removed from the 3D printed object.

14. The additive manufacturing system of claim 12, wherein the compound distributor forms multiple resonators in the powdered build material.

15. The additive manufacturing system of claim 12, wherein each resonator of the at least one resonator has a unique combination of resonant frequencies to identify the 3D printed object.

* * * * *